United States Patent
Gupta et al.

(10) Patent No.: US 10,241,782 B2
(45) Date of Patent: *Mar. 26, 2019

(54) PATCHING OF VIRTUAL MACHINES WITHIN SEQUENTIAL TIME WINDOWS

(71) Applicant: International Business Machines Corporation, Armonk, NY (US)

(72) Inventors: Manish Gupta, New Delhi (IN); Rajeev Puri, Huntersville, NC (US)

(73) Assignee: International Business Machines Corporation, Armonk, NY (US)

(*) Notice: Subject to any disclaimer, the term of this patent is extended or adjusted under 35 U.S.C. 154(b) by 103 days.

This patent is subject to a terminal disclaimer.

(21) Appl. No.: 15/396,858

(22) Filed: Jan. 3, 2017

(65) Prior Publication Data

US 2017/0192769 A1 Jul. 6, 2017

Related U.S. Application Data

(63) Continuation of application No. 14/989,089, filed on Jan. 6, 2016, now Pat. No. 9,696,985.

(51) Int. Cl.
*G06F 8/65* (2018.01)
*G06F 9/50* (2006.01)
(Continued)

(52) U.S. Cl.
CPC ............... *G06F 8/656* (2018.02); *G06F 8/65* (2013.01); *G06F 9/455* (2013.01);
(Continued)

(58) Field of Classification Search
CPC ..................... G06F 8/60–8/66; G06F 9/455
See application file for complete search history.

(56) References Cited

U.S. PATENT DOCUMENTS 8,261,353 B2   9/2012 Hirsave et al.
8,359,594 B1 * 1/2013 Davidson ............ G06F 9/5077
                                                        709/218

(Continued)

OTHER PUBLICATIONS

Luo, C., et al., Optimized patch applying schedule within multiplex software architecture, APARM 2014, Aug. 2014, 8 pages, [retrieved on Sep. 15, 2016], Retrieved from the Internet: <URL:https://www.researchgate.net>.*

(Continued)

*Primary Examiner* — Geoffrey R St Leger
(74) *Attorney, Agent, or Firm* — Schmeiser, Olsen & Watts, LLP; Mark Vallone

(57) ABSTRACT

A method and associated system. A patching schedule is generated by scheduling, in W sequential time windows, P patches applicable to virtual machines in L redundancy groups. Each redundancy group includes virtual machines and independently belongs to a respective software application x of X software applications, wherein $P \geq 1$, $L \geq 1$, $R_m \geq 1$, and $X \geq 1$. The L redundancy groups collectively comprise at least 2 virtual machines. The scheduling determines $x_{wmk}$ for T tuples (w, m, k) defined by (w=1, ..., W) and (m=1, ..., L) and (k=1, ..., $R_m$), by maximizing an objective function subject to constraints. Determining $x_{wmk}$ includes setting $x_{wmk}=1$ if virtual machine k in redundancy group m is to be patched in time window w or setting $x_{wmk}=0$ otherwise.

19 Claims, 5 Drawing Sheets

(51) Int. Cl.
*G06F 11/14* (2006.01)
*G06F 8/656* (2018.01)
*G06F 9/455* (2018.01)

(52) U.S. Cl.
CPC ...... *G06F 9/45533* (2013.01); *G06F 9/45558* (2013.01); *G06F 11/14* (2013.01); *G06F 9/5077* (2013.01); *G06F 2009/45591* (2013.01)

(56) References Cited

U.S. PATENT DOCUMENTS

| | | | | |
|---|---|---|---|---|
| 9,164,755 | B2* | 10/2015 | Leitman | G06F 8/65 |
| 9,262,152 | B1* | 2/2016 | Kurian | G06F 8/65 |
| 2006/0080656 | A1 | 4/2006 | Cain et al. | |
| 2006/0095484 | A1* | 5/2006 | Erramilli | G05B 13/021 |
| | | | | 708/200 |
| 2009/0100420 | A1* | 4/2009 | Sapuntzakis | G06F 8/65 |
| | | | | 717/171 |
| 2009/0106748 | A1* | 4/2009 | Chess | G06F 8/65 |
| | | | | 717/168 |
| 2009/0172669 | A1* | 7/2009 | Bobak | G06F 8/34 |
| | | | | 718/100 |
| 2011/0154320 | A1* | 6/2011 | Verma | G06F 8/63 |
| | | | | 718/1 |
| 2011/0161949 | A1* | 6/2011 | Kodaka | G06F 8/656 |
| | | | | 717/168 |
| 2011/0161957 | A1* | 6/2011 | Bernardi | G06F 9/505 |
| | | | | 718/1 |
| 2011/0265076 | A1* | 10/2011 | Thorat | G06F 8/65 |
| | | | | 717/172 |
| 2012/0102480 | A1* | 4/2012 | Hopmann | G06F 8/656 |
| | | | | 717/172 |
| 2012/0198447 | A1* | 8/2012 | Osogami | G06F 9/5066 |
| | | | | 718/1 |
| 2013/0152077 | A1* | 6/2013 | Leitman | G06F 8/65 |
| | | | | 718/1 |
| 2013/0263104 | A1* | 10/2013 | Baset | G06F 8/68 |
| | | | | 717/168 |
| 2013/0275979 | A1 | 10/2013 | Tsirkin | |
| 2014/0068613 | A1* | 3/2014 | Iriguchi | G06F 8/656 |
| | | | | 718/1 |
| 2014/0229939 | A1* | 8/2014 | Dias de Assuncao | G06F 8/63 |
| | | | | 718/1 |
| 2014/0289718 | A1 | 9/2014 | Leitman et al. | |
| 2015/0212808 | A1* | 7/2015 | Mandava | G06F 8/65 |
| | | | | 717/168 |
| 2015/0220320 | A1* | 8/2015 | Chen | G06F 9/44536 |
| | | | | 717/170 |
| 2016/0103673 | A1* | 4/2016 | Curran | G06F 8/65 |
| | | | | 717/168 |

OTHER PUBLICATIONS

Okamura, H., et al., Optimal Security Patch Release Timing Under Non-Homogeneous Vulnerability-Discovery Processes, 20th International Symposium on Software Reliability Engineering, 2009, pp. 120-128, [retrieved on Sep. 15, 2016], Retrieved from the Internet: <URL:http://ieeexplore.ieee.org/>.*

Beattie, S., et al., Timing the Application of Security Patches for Optimal Uptime, LISA XVI, 2002, pp. 101-110, [retrieved on Sep. 15, 2016], Retrieved from the Internet: <URL:http://www.homeport.org/~adam/time-to-patch-usenix-lisa02.pdf>.*

Schwarzkopf, R., et al., Multi-Layered Virtual Machines for Security Updates in Grid Environments, 35th Euromicro Conference on Software Engineering and Advanced Applications, 2009, pp. 563-570, [retrieved on Sep. 17, 2016], Retrieved from the Internet: <URL:http://ieeexplore.ieee.org/>.*

Netto, M., et al., When Cloud Virtual Machine Images Need to Be Updated, IFIP/IEEE International Symposium on Integrated Network Management, 2013, pp. 884-887, [retrieved on Sep. 15, 2016], Retrieved from the Internet: <URL:http://ieeexplore.ieee.org/>.*

Cavusoglu, H., et al., Security Patch Management: Share the Burden or Share the Damage?, Management Science, vol. 54, No . 4, Apr. 2008, pp. 657-670, [retrieved on Sep. 16, 2016], Retrieved from the Internet: <URL:https://pdfs.semanticscholar.org/6fc4/b9c96cdd68274eda7a809d04194b59400d3f.pdf>.*

Notice of Allowance (dated Feb. 14, 2017) for U.S. Appl. No. 14/989,089, filed Jan. 6, 2016.

Schwarzkopf et al., Multi-Layered Virtual Machines for Security Updates in Grid Environments, 2009 35th Euromicro Conference on Software Engineering and Advanced Applications, 978-0-7695-3784-0109, DOI 10.1109/SEAA.2009.74, pp. 563-570.

Okamura et al., Optimal Security Patch Release Timing Under Non-Homogeneous Vulnerability-Discovery Processes, 978-0-7695-3878-5/09, 2009 IEEE, DOI 10.1109/ISSRE.2009.19, pp. 120-128.

Notice of Allowance (dated Sep. 22, 2016) for U.S. Appl. No. 14/989,089, filed Jan. 6, 2016.

* cited by examiner

PATCHING OF VIRTUAL MACHINES WITHIN SEQUENTIAL TIME WINDOWS

This application is a continuation application claiming priority to Ser. No. 14/989,089, filed Jan. 6, 2016, now U.S. Pat. No. 9,696,985, issued Jul. 4, 2017.

TECHNICAL FIELD

The present invention relates generally to scheduling patches and in particular, to scheduling patches, in sequential time windows, applicable to virtual machines within redundancy groups.

BACKGROUND

Current practice for patching software is inefficient and prone to error.

SUMMARY

The present invention provides a method, and associated system and computer program product, for patching virtual machines in L redundancy groups in accordance with a patching schedule.

A processor of a computer system generates the patching schedule applicable for patching the virtual machines in the L redundancy groups.

Generating the patching schedule includes scheduling, in W sequential time windows, P patches applicable to one or more virtual machines in the L redundancy groups, each redundancy group m (m=1, . . . , L) comprising $R_m$ virtual machines, each redundancy group m (m=1, . . . , L) independently belonging to a respective software application x of X software applications, wherein $P \geq 1$, $L \geq 1$, $R_m \geq 1$, and $X \geq 1$, wherein the L redundancy groups collectively comprise at least 2 virtual machines.

The scheduling of the patching schedule includes determining, by the processor, $x_{wmk}$ for T tuples (w, m, k) defined by (w=1, . . . , W) and (m=1, . . . , L) and (k=1, . . . , $R_m$), by maximizing an objective function (F) subject to one or more constraints, wherein determining $x_{wmk}$ comprises setting $x_{wmk}=1$ if virtual machine k in redundancy group in is to be patched in time window w or setting $x_{wmk}=0$ otherwise.

The objective function F is a linear combination of N objective function components $F_n$ (n=1, . . . , N) expressed as $F = \sum_{n=1}^{N} \alpha_n F_n$ subject to $N \geq 1$, wherein $\alpha_n$ (n=1, . . . , N) are specified weights satisfying $\alpha_1 > 0$ and $\alpha_n \geq 0$ if $n > 1$, wherein $F_1 = \sum_{x=1}^{X} B_x \min_w (\Pi_{m=1}^{L} A(x, m, n_{wm}) - \Pi_{m=1}^{L} A(x, m, 0))$, wherein $B_x$ denotes a business criticality of software application x, wherein $n_{wm}$ is a total number of virtual machines in redundancy group m assigned to time window w, wherein $n_{wm} = \sum_{k=1}^{R_m} x_{wmk}$, and wherein $A(x, m, n_{wm})$ denotes a residual availability of redundancy group m belonging to software application x when the $n_{wm}$ virtual machines in redundancy group m are not available in time window w.

DETAILED DESCRIPTION

A virtual machine (VM) is configured to a specific software application in a platform independent manner. In one embodiment, a virtual machine is a server.

A redundancy group comprises one or more virtual machines. Each virtual machine in a given redundancy group is configured to execute the same software application with potentially different configuration. Thus, each given redundancy group is said to belong to the software application that the virtual machines in the given redundancy group are configured to execute.

The present invention schedules, in sequential time windows, patches applicable to one or more virtual machines in one or more redundancy groups. The patching schedule generated in accordance with the present invention is characterized by maximization, subject to one or more constraints, of an objective function. The objective function may differ in different executions of the method of the present invention and reflects business objectives and criticalities.

Figure 1:
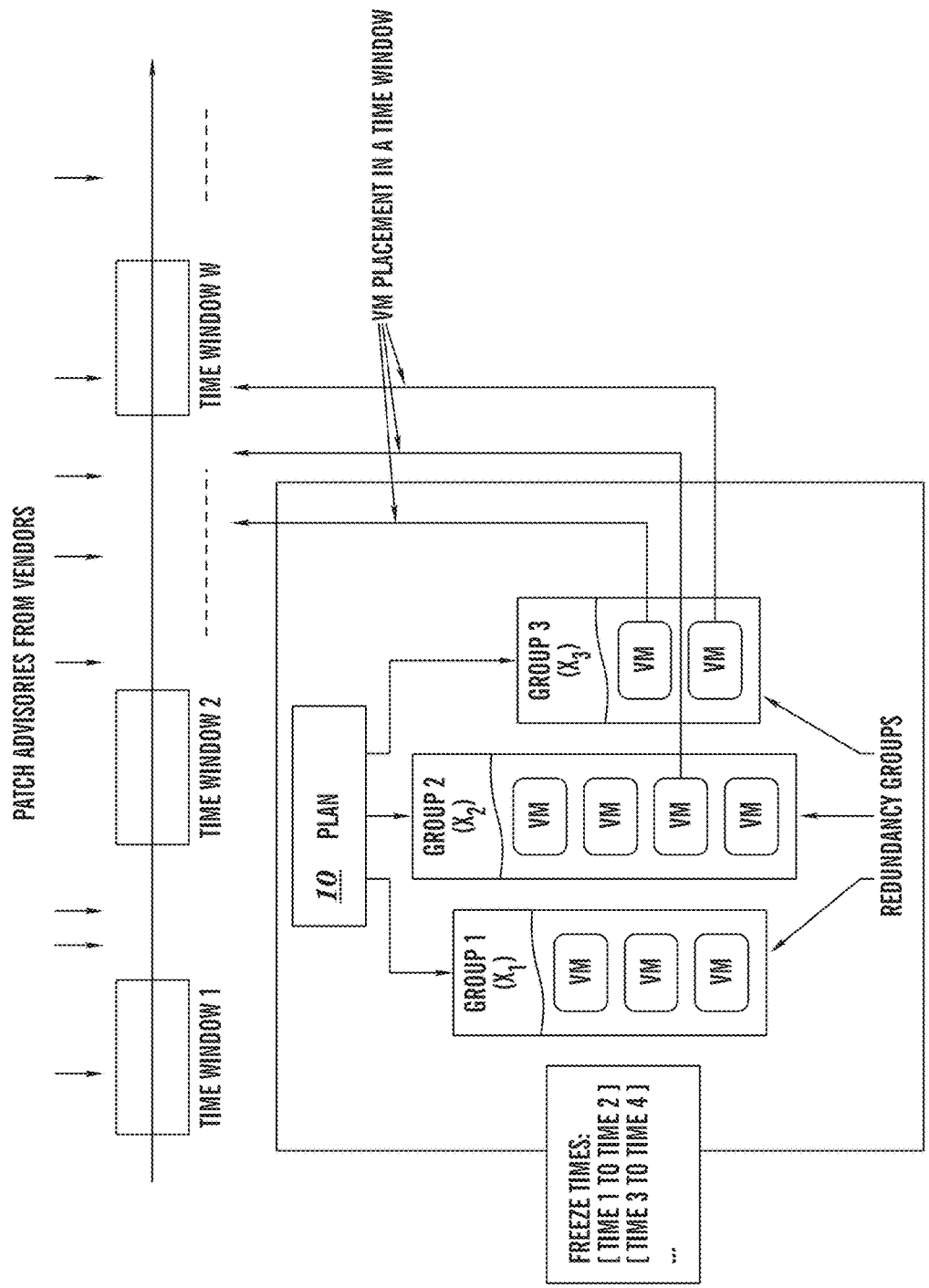
FIG. 1 illustrates scheduling of patching virtual machines of redundancy groups into time windows, in accordance with embodiments of the present invention.

FIG. 1 illustrates scheduling of patching virtual machines of redundancy groups into time windows, in accordance with embodiments of the present invention. Three redundancy groups (group 1, group 2, group 3), which may have its members started and stopped in the right order required for the workload to function properly by a plan 10 (e.g., a management plan), comprises three VMs in group 1, four VMs in group 2, and two VMs in group 3.

The resultant schedule assigns each VM for placement in (i.e., for being patched within) one time window of the depicted W time windows which are denoted as time window 1, time window 2, . . . , time window W, wherein W=3 in FIG. 1.

The redundancy groups 1, 2 and 3 belong to software applications $x_1$, $x_2$ and $x_3$, respectively. In one embodiment, software applications $x_1$, $x_2$ and $x_3$ are different software applications. In one embodiment, two or more software applications of software applications $x_1$, $x_2$ and $x_3$ are a same software application (e.g., software applications $x_1$, $x_2$ and $x_3$ may be a same software application; software applications $x_2$ and $x_3$ may be a same software application differing from software application $x_1$, etc.). Thus, although all VMs in a given redundancy group are configured to execute a same single software application that the given redundancy group belongs to, in some embodiments two or more redundancy groups may belong to a same software application.

In one embodiment, one customer may own, control, and/or use different software applications. In one embodiment, different customers may own, control, and/or use different software applications. In one embodiment, in a multi-tenant cloud, software applications may be hosted on a shared platform, with a single team responsible for patching the VMs of redundancy groups of the different software applications, wherein the time windows during which VMs are patched include VMs from multiple tenants.

The patch advisories received from vendors are patch notifications for selectively patching the VMs.

The freeze times are time intervals (e.g., from time 1 to time 2) during which specifically indicated VMs must not be patched.

Inputs

The following list of symbols are inputs and associated definitions.

P=total number of patches that need to be applied; the patches are indexed by p.

W=total number of future time windows provided for patching; the time windows are indexed by w; the index w also applies to patch categories, since each patch category is applied in an associated time window w; thus the terms "patch category" and "time window" are interchangeable.

L=total number of redundancy groups; the redundancy groups are indexed by m; may be obtained from a workload definition, may be consumer specified, or could be determined from a configuration management database (CMDB) if available.

$R_m$=total number of virtual machines in the redundancy group m; the virtual machines in redundancy group m are indexed by k.

$AR_m$=minimum number of virtual machines to be available in redundancy group m for redundancy group m to be available.

$A_{pmk}$=1 or 0 if the patch p is, or is not, applicable to virtual machine k in redundancy group in, respectively (for application level patches, the consumer may provide information as to whether a non-functional or functional update is applicable for a virtual machine).

$M_{wmk}$=1 or 0 if virtual machine k in redundancy group m can, or cannot, be patched in time window w, respectively (a consumer may provide freeze times that determine which time window(s) not possible).

f=probability of failure of a virtual machine (e.g., due to operating system).

$\lambda_{wmk}$=predicted rate of arrival of patching requests in time window w directed to virtual machine k in redundancy group m (the consumer could provide estimates for $\lambda_{wmk}$).

$R_p(w)$=risk (between 0 and 1 inclusive) of applying patch p in the time window w (the higher the severity of the patch, the higher the risk; also, the risk increases with the increasing value of w; for application level updates, the risk may be provided by the consumer).

$C_w$=maximum number of virtual machines that can be patched in time window w.

X=total number of software applications; the software applications are indexed by x.

$B_x$=business criticality of software application x.

$S_{xm}$=1 or 0 if redundancy layer m belongs, or does not belong, to software application x, respectively.

$D_{mskj}$=1 or 0 if virtual machine k in redundancy group m should, or should not, be patched in an earlier time window than virtual machine j in redundancy group s, respectively (e.g., patch "test" before "production"). Alternatively, $D_{mskj}$=1 or 0 if virtual machine j in redundancy group s should be stopped before virtual machine k in redundancy group m is patched, respectively.

$B_{mskj}$ (relevant only if $D_{mskj}$=1)=minimum time interval (e.g., minimum number of days) between patching virtual machine k in redundancy group m and virtual machine j in redundancy group s.

Outputs

The following list of symbols (also called decision variables) are outputs with associated definitions.

$x_{wmk}$=1 or 0 if virtual machine k in redundancy group m is, or is not, in time window w, respectively.

$c_w$=1 or 0 if the patch window w is used, or is not used, by any virtual machine in any redundancy group, respectively.

$z_{mk}$=1 or 0 if virtual machine k in redundancy group m is to be patched, respectively.

Summation Abbreviations

Figure 2:
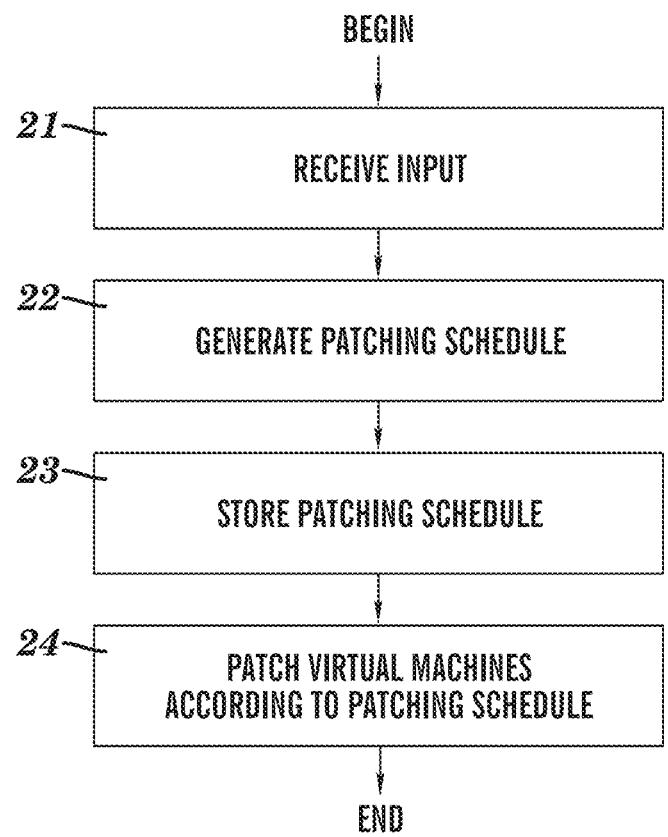
FIG. 2 is a flow chart of a method for patching virtual machines, in accordance with embodiments of the present invention.

Unless otherwise stated, the following summation abbreviations are defined as follows, $\Sigma_p = \Sigma_{p=1}^{P}$
$\Sigma_w = \Sigma_{w=1}^{W}$
$\Sigma_m = \Sigma_{m=1}^{L}$
$\Sigma_k = \Sigma_{k=1}^{R_m}$
$\Sigma_x = \Sigma_{x=1}^{X}$ FIG. 2 is a flow chart of a method for patching virtual machines, in accordance with embodiments of the present invention. The method of FIG. 2 includes steps 21-24.

Step 21 receives, by a processor of a computer system, inputs, which may include some or all of the inputs identified supra.

The inputs may reflect patch applicability to a particular VM, which may be determined, for example, by running a script to determine if the patch is applicable.

Determining the inputs may use discovery systems (e.g., Tivoli Application Dependency Discovery Manager (TADDM), Configuration Management Database (CMDB)) and/or and asset discovery systems (e.g., IBM Endpoint Manager (IEM) for structure of software applications application and/or patching metadata.

Inputs may be obtained from human specification of high-level parameters and metadata related to patching/upgrade (such as if an upgrade is applicable to software within a VM); humans may also provide missing structure information.

In addition, the inputs may reflect a change in patch categories' metadata, new advisory or approval received for patching a virtual machine and/or a change in software applications and metadata.

The input number of patching windows/categories (W) may depend on the user input on categories dates on which the patching cannot be done; i.e., the matrix $M_{wmk}$. The patching will also be governed by the service provider in terms of what is the latest date by which all the patches in the current patch list must be complete. The service provider may introduce new patch categories depending on the backlog of VMs to be patched. In general, there is no limit to the number W and could be chosen as large as is required to optimize the cost function with respect to the constraints including risk of not patching.

Step 22 generates, by the processor, a patching schedule. Generating the patching schedule comprises scheduling, in W sequential time windows, P patches applicable to one or more virtual machines in L redundancy groups. Each redundancy group m (m=1, . . . , L) comprises $R_m$ virtual machines. Each redundancy group m (m=1, . . . , L) independently belongs to a respective software application x of X software applications, wherein P≥1, L≥1, $R_m$≥1, and X≥1, wherein the L redundancy groups collectively comprise at least 2 virtual machines.

Scheduling the patching schedule comprises determining $x_{wmk}$ for T tuples (w, m, k) defined by (w=1, . . . , W) and (m=1, . . . , L) and (k=1, . . . , $R_m$), by maximizing an objective function (F), wherein said determining $x_{wmk}$ comprises setting $x_{wmk}=1$ if virtual machine k in redundancy group m is to be patched in time window w or setting $x_{wmk}=0$ otherwise.

In one embodiment, the objective function is maximized subject to one or more constraints, so that the determined values of $x_{wmk}$ are those values of $x_{wmk}$ that maximize the objective function F subject to the one or more constraints.

In one embodiment, the one of more constraints comprise a freeze time constraint of setting $x_{wmk}=0$ for t tuples of the T tuples independent of maximizing F, subject to t<T.

Maximizing the objective function (F) subject to one or more constraints may be implemented by any mathematical or numerical technique known in the art for maximizing a function subject to constraints.

The mathematical form(s) of the objective function (F) maximizing the objective function will be discussed infra.

Step 23 stores, by the processor, the determined $x_{wmk}$ for the T tuples, in a data store of the computer system Step 24 patches the virtual machines according to the patching schedule.

Figure 3:
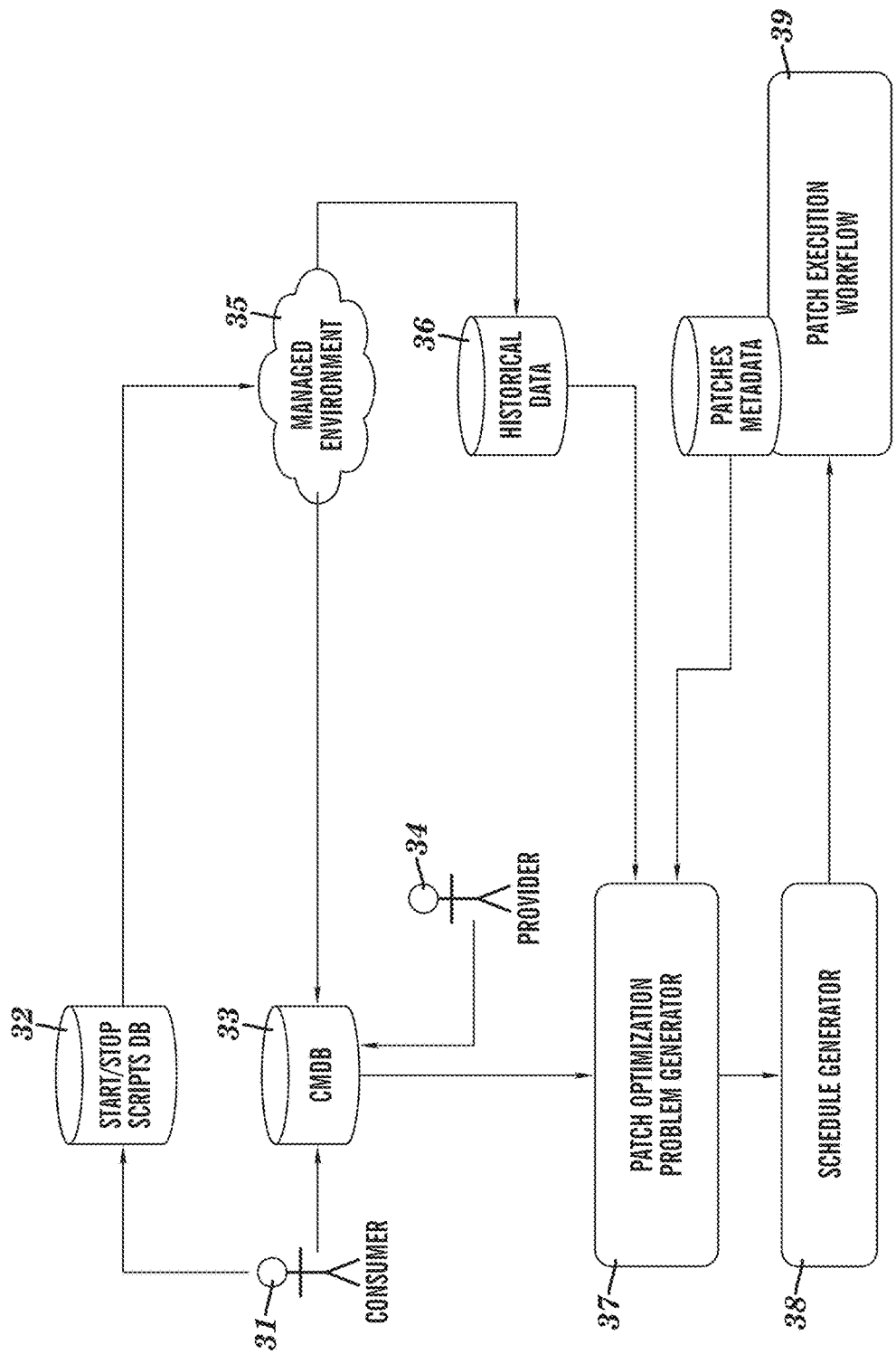
FIG. 3 is a system diagram for patching virtual machines, in accordance with embodiments of the present invention.

FIG. 3 is a system diagram for patching virtual machines, in accordance with embodiments of the present invention.

A consumer 31 provides, to a stop/start scripts database 32 and a configuration management database (CMDB) 33, constraints (e.g., changing freeze times, patch-to-VM applicability, application structure, software start stop scripts, etc.).

Scripts accessed from the stop/start scripts database 32 are provided to a management environment 35 for performing orchestrated start and stop of software in virtual machines.

The management environment 35 provides, to the CMDB, structure of application estimated from monitored and discovered data.

Patch Optimization Problem Generator monitors historical data 36.

A service provider 34 provides, to the CMDB, patch categories, constraints (e.g. number of patches that can be performed per category), weights for the objective functions, etc.

Inputs are provided, from the CMDB to a Patch Optimization Problem Generator 37, to generate the optimization problem.

Data obtained from a historical database 36 (e.g., VM failure probability, request arrival rates to components, etc.) is provided to the Patch Optimization Problem Generator 37.

The Patch Optimization Problem Generator 37 provides inputs to a Schedule Generator 38 (step 21 of FIG. 2).

The Schedule Generator 38 generates the patching schedule for patching the virtual machines (step 22 of FIG. 2).

Figure 4:
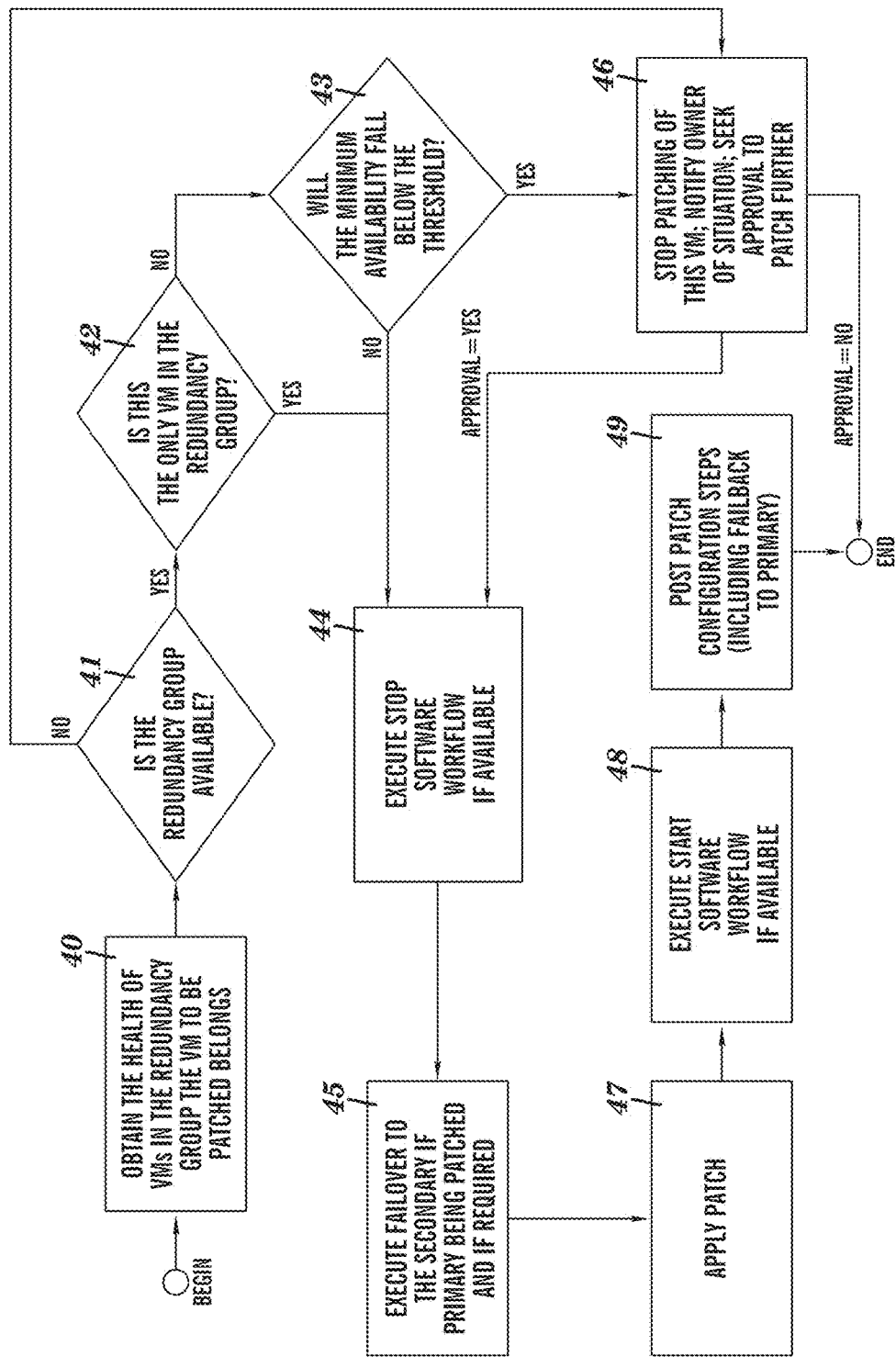
FIG. 4 is a flow chart describing a patch execution workflow for patching virtual machines, in accordance with embodiments of the present invention.

The patching schedule generated by the Schedule Generator 38 is used in the Patch Execution Workflow 39 which is described in more detail in FIG. 4.

Output from the Patch Execution Workflow 39 (e.g., patches, metadata) may feed back to the Patch Optimization Problem Generator 37.

FIG. 4 is a flow chart describing a patch execution workflow for patching virtual machines, in accordance with embodiments of the present invention. The flow chart of FIG. 4 describes Patch Execution Workflow 39 of FIG. 3 in more detail. FIG. 4 comprises steps 40-49.

Step 40 obtains the health of VMs in the redundancy group comprising the VM to be patched. The health of a VM determines whether the VM can be executed.

Step 41 determines whether the redundancy group comprising the VM to be patched is available.

If step 41 determines that the redundancy group comprising the VM to be patched is available (YES branch), then step 42 is next executed; otherwise (NO branch) step 46 is next executed.

Step 42 determines whether the VM to be patched is the only VM in the redundancy group containing the VM to be patched.

If step 42 determines that the VM to be patched is the only VM in the redundancy group containing the VM to be patched (YES branch), then step 44 is next executed; otherwise (NO branch) step 43 is next executed.

Step 43 determines whether the minimum availability of the redundancy group comprising the VM to be patched is below a specified or predetermined availability threshold.

If step 43 determines that the minimum availability of the redundancy group comprising the VM to be patched is below a specified or predetermined availability threshold (YES branch), then step 46 is next executed; otherwise (NO branch) step 44 is next executed, Step 46 stops patching of the VM to be patched, notifies the owner of the VM to be patched that the minimum availability of the redundancy group comprising the VM to be patched is below the specified availability threshold, and seeks approval from the owner to patch further.

If the owner does not approve patching further, then the process ends; otherwise (owner approves further patching), step 44 is next executed.

Step 44 executes stop software workflow for stopping the patching of the VM to be patched.

Step 45 execute failover to a secondary VM to be patched if a primary VM is being patched and if the secondary VM is required to be patched.

Step 47 patches the VM to be patched,

Step 48 executes start software workflow if available.

Step 49 performs post-patch configuration steps (including failback to primary VM); then the process ends.

In accordance with FIG. 4, the Patch Execution Workflow includes: (a) an ability to "halt" patching (step 46) if the minimum availability is below a specified or determined threshold value (YES branch from step 43), (b) automatic stopping of dependent software (step 44), and (c) execute failover to a secondary VM if the secondary VM is required to be patched (step 45).

The objective function F to be maximized is a linear combination of N objective function components $F_n$ (n=1, ..., N), wherein N≥1, Thus, the objective function F is of the form:

$$F = \sum_{n=1}^{N} \alpha_n F_n \quad (1)$$

wherein $\alpha_n$ (n=1, ..., N) are constants satisfying $\alpha_n$ (n=1, ..., N)≥0 such that at least one of the $\alpha_n$ values ($\alpha_{n1}$) is a positive (i.e., $\alpha_{n1}$>0). The constants $\alpha_n$ are weights for the respective objective function components $F_n$ (n=1, ..., N). The weights $\alpha_n$ (n=1, ..., N) can be adjusted to meet the business requirements. In one embodiment, the weights $\alpha_n$ are normalized as follows:

$$\sum_{n=1}^{N} \alpha_n = 1 \quad (2)$$

The present invention may utilize, inter alia, objective function components ($F_n$) relating to: residual availability decrease ($F_{RAD}$), unused patch categories ($F_{UPC}$), fraction of lost patch requests ($F_{FLR}$) and/or risk due to the patching schedule ($F_{RPS}$). Thus, the objective function components $F_n$ in Equation (1) may include any or all of $F_{RAD}$, $F_{UPC}$, $F_{FLR}$ and $F_{RPS}$.

Objective Function Component Relating to Residual Availability Decrease ($F_{RAD}$)

Availability of a redundancy group m belonging to software application x, when $n_{wm}$ VMs are not available, is given by:

$$A(x,m,n_{wm}) = (1 - S_{xm} \Sigma_{i=AR_m}^{R_m - n_{wm}} (R_{m_i}) f^i (1-f)^{R_m - i}) \quad (3)$$

As VMs are patched in a given redundancy group m, the residual availability of the group m is $A(x, m, n_{wm})$, wherein $n_{wm}$ is the number of VMs in redundancy group m assigned to the time window w.

The customer defined acceptable availability for redundancy layer m belonging to application x is:

$$A(x, m, 0) := (1 - S_{xm} \Sigma_{i=AR_m}^{R_m} (R_{m_i}) f^i (1-f)^{R_m - i}) \quad (4)$$

The decrease in the availability of application x below an acceptable availability of application x is defined as $\min_w (\Pi_{m=1}^L A(x, m, n_{wl}) - \Pi_{m=1}^L A(x, m, 0))$.

Accordingly, the objective function component relating to the residual availability, and also to business criticality $B_x$, of each application x is:

$$F_{RAD} = \Sigma_x B_x \min_w (\Pi_{m=1}^L A(x,m,n_{wm}) - \Pi_{m=1}^L A(x,m,0)) \quad (5)$$

Objective Function Component Relating to Unused Patch Categories ($F_{UPC}$)

Each patch may require attention of operators so that, in case of an issue with a particular VM being patched occurs (e.g., a VM not rebooting/restarting, etc.), the operator can intervene and remediate. Unused patch categories (i.e., unused time windows) are defined as: $(W - \Sigma_{w=1}^W c_w)$.

Accordingly, the objective function component relating to unused patch categories is:

$$F_{UPC} = W - \Sigma_{w=1}^W c_w \quad (6)$$

As defined supra, $c_w = 1$ or 0 if the patch window w is used, or is not used, by any virtual machine in any redundancy group, respectively. It is noted that a patch category w is identified with time window w.

Objective Function Component Relating to Fraction of Lost Patch Requests ($F_{FLR}$)

If one or more VMs of an application are patched simultaneously, then the capacity of the application decreases. The capacity of the application also depends on which patch categories (i.e., time windows) the VMs are patched in, because if a VM is patched in a patch category where the arrival rate of patches is expected to be higher, then the patch requests potentially lost is also higher.

The fraction of lost patch requests due to patch category w (i.e., time window defined as:

$$I_w = \Sigma_{m=1}^L \Sigma_{k=1}^{R_m} x_{wmk} \lambda_{wmk} / \Sigma_{w=1}^W \Sigma_{m=1}^L \Sigma_{k=1}^{R_m} \lambda_{wmk} \quad (7)$$

Thus the fraction of patch requests that are "served" (i.e., not lost) is: $\Sigma_{w=1}^W (1 - I_w)$.

Accordingly, the objective function component relating to fraction of lost patch requests is:

$$F_{FLR} = \Sigma_{w=1}^W (1 - I_w) \quad (8)$$

Objective Function Component Relating to Risk due to the Patching Schedule ($F_{RPS}$)

If all patches were to be applied in the last patch category w=W (i.e., last time window W), then the total risk would be maximum: $\Sigma_x B_x \Sigma_{p,m,k} S_{xm} A_{pmk} x_{Wmk} R_p(W)$ On the other hand, any other configuration would result in a risk which is less than the maximum risk and is given by: $\Sigma_x B_x \Sigma_{p,w,m,k} S_{xm} A_{pmk} x_{wmk} R_p(w)$.

Accordingly, the objective function component relating to risk due to the patching schedule is:

$$F_{RPS} = 1 - \frac{\Sigma_x B_x \Sigma_{p,w,m,k} S_{xm} A_{pmk} x_{wmk} R_p(w)}{\Sigma_x B_x \Sigma_{p,m,k} S_{xm} A_{pmk} x_{Wmk} R_p(W)} \quad (9)$$

Note that $F_{RPS}$ relates the business criticality $B_x$ of a software application x to the risk of patching of a VM k of software application x. Thus, higher business criticality of a software application carries higher overall risk for a given p and w.

Constraints

Any or all of the following constraints may be imposed on the process of maximizing the objective function F. All imposed constraints must be satisfied.

A freeze time constraint is setting $x_{wmk} = 0$ for t tuples of the T tuples independent of maximizing F, subject to t<T.

A redundancy group size constraint is:

$$n_{wm} = \Sigma_{k=1}^{R_m} x_{wmk} \quad (10)$$

wherein $n_{wm}$ is the number of members of redundancy group m assigned to the patch window w.

A capacity constraint on the number of virtual machines that can be patched in a given window w is:

$$C_w \geq \Sigma_{m=1}^L n_{wm} \quad (11)$$

If a particular time window w1 is not to be used then $C_{w1}$ is set to 0.

The capacity constraint sets an upper limit of $C_w$ on a number of virtual machines that can be patched in time window w (w=1, ..., W).

An only one applicable patch category constraint is that virtual machine k of redundancy group m is assigned to one and only one applicable patch window and only if virtual machine k requires patching:

$$\Sigma_{w=1}^W M_{wmk} x_{wmk} = z_{mk} \quad (12)$$

$$\Sigma_{p=1}^P A_{pmk} \geq z_{mk} \geq \Sigma_{p=1}^P A_{pmk}/P \quad (13)$$

A workload only constraint is that a patch window w is considered for a workload only (i.e., software application only) if there is at least one VM assigned to the software application:

$$c_w \geq \Sigma_{m=1}^L n_{wm}/R_m \quad (14)$$

A fraction of lost requests constraint is that the fraction of lost requests $I_w$ (see Equation (7)) must be less than a specified or predetermined fraction of lost requests threshold ($I_{w-th}$):

$$I_w < I_{w-th} \quad (15)$$

A patch dependencies constraint is that, for every w, m, k for which there is at least one entry of 1 in $D_{mskj}$, which ensures that patch dependencies represented by $D_{mskj}$ are honoured, is:

$$\frac{\sum_{p=1}^{P} \sum_{v=1}^{w} \sum_{s,j} A_{psj} D_{mskj} x_{vsj}}{\sum_{s,j} D_{mskj}} \leq \sum_{v=1}^{w} x_{vmk} \quad (16)$$

A patching between two VMs constraint is that patching between two VMs should be $\geq B_{mskj}$:

$$\Sigma_{v,u} (u x_{usj} - v x_{vmk}) D_{mskj} \geq B_{mskj} \quad (17)$$

A minimum objective function constraint is that the objective function F must be equal to or greater than a specified or predetermined minimum F threshold ($F_{th}$):

$$F \geq F_{th} \quad (20)$$

A computing time constraint is that a total computer time, for determining $x_{wmk}$ that maximizes the objective function, exceeds a specified or predetermined maximum computer time threshold $t_{max-th}$.

EXAMPLE

This example determines a patching schedule (i.e., determining $x_{wmk}$) using the following inputs.
P=2, number of patches
W=2, number of patch windows
L=2, number of redundancy groups
$R_1=R_2=2$ (i.e., 2 VMs in each redundancy group)
$AR_1=1, AR_2=1$ (minimum number virtual machines in each redundancy group that need to be running for the redundancy group to be available)
$A_{111}=1, A_{112}=1, A_{121}=1, A_{221}=1, A_{222}=1$ (applicability of patches to the virtual machines in a redundancy group)
$M_{111}=1, M_{211}1, M_{112}=1, M_{212}=1, M_{221}=1, M_{222}=1$; remaining elements of $M_{wmk}$ are 0 (constraints on which virtual machines in a redundancy group can be patched in a window)
f:=0.05
$\lambda_{111}:=10, \lambda_{211}:=5, \lambda_{112}:=5, \lambda_{212}:=5, \lambda_{121}:=1, \lambda_{221}:=10, \lambda_{122}:=0, \lambda_{222}:=10$
$R_1(1):=0.5, R_1(2):=1, R_2(1):=0, R_2(2):=0.1$; the risk of applying a patch p in a window w
$C_1:=1, C_2:=10$: the number of patches that can be processed in a window
$B_1:=1, B_2:=0.1$: the business criticality of application x
$S_{11}:=1, S_{22}:=1$, remaining elements of $S_{xm}$ are 0: which redundancy group belongs to which application
$D_{lskj}:=0 \ldots$; i.e., no dependency between the members of the redundancy group in terms of patching order
$B_{lskj}:=0 \ldots$; i.e., no constraint on the minimum time interval between patching any two virtual machines The objective function for this example is the objective function component relating to fraction of lost patch requests ($F_{FLR}$)—see Equation (8).

This example uses two constraints, namely a capacity constraint (Equation (11)) and an only one applicable patch category constraint (Equations (12)-(13)).

In this example, the scheduling is performed by: (i) determining five potential solution vectors $x_{wmk}$; (ii) applying the constraints to eliminate some of the potential solution vectors; and (iii) determining which of the remaining solution vectors has the highest value of the objective function.

The five potential solution vectors $x_{wmk}$ are determined by Monte Carlo randomly sampling from a uniform probability distribution in in domain {0,1}; i.e., if the random number is between 0 and 0.5 inclusive $x_{wmk}=1$; otherwise $x_{wmk}=0$. The resulting five potential solution vectors $x_{wmk}$, which are denoted as (a), (b), (c), (d), and (e), are as follows:

| Group, VM (m, k) | w = 1 | w = 2 |
|---|---|---|
| Potential Solution Vector (a) | | |
| 1, 1 | 1 | 0 |
| 1, 2 | 1 | 0 |
| 2, 1 | 1 | 0 |
| 2, 2 | 1 | 0 |
| Potential Solution Vector (b) | | |
| 1, 1 | 0 | 1 |
| 1, 2 | 1 | 0 |
| 2, 1 | 1 | 0 |
| 2, 2 | 1 | 0 |
| Potential Solution Vector (c) | | |
| 1, 1 | 1 | 0 |
| 1, 2 | 0 | 1 |
| 2, 1 | 0 | 1 |
| 2, 2 | 0 | 1 |
| Potential Solution Vector (d) | | |
| 1, 1 | 0 | 1 |
| 1, 2 | 0 | 1 |
| 2, 1 | 1 | 0 |
| 2, 2 | 0 | 1 |
| Potential Solution Vector (e) | | |
| 1, 1 | 0 | 1 |
| 1, 2 | 1 | 0 |
| 2, 1 | 0 | 1 |
| 2, 2 | 0 | 1 |

The capacity constraint of $C_w \geq \sum_{m=1}^{L} n_{wm}$ eliminates potential solution vectors (a) and (b), because $C_1=1$ and in both vectors (a) and (b), and the number of assigned patches to time window 1 is greater than $C_1=1$, namely 4 for potential solutions (a) and 3 for potential solutions (b).

The only one applicable patch category constraint of $\sum_{w=1}^{W} M_{wmk} x_{wmk} = z_{mk}$ and $\sum_{p=1}^{P} A_{pmk} \geq z_{mk} \geq \sum_{p=1}^{P} A_{pmk}/P$ eliminates potential solutions (d), due to restraint imposed by $M_{wlk}$ on the patching of redundancy group 2 in time window 2.

The next step is to determine which of the remaining potential solution vectors, (c) and (e), maximizes the objective function for this example, which is the objective function $F_{FLR}$ relating to fraction of lost patch requests; i.e., $I_w = \sum_{m=1}^{L} \sum_{k=1}^{R_m} x_{wmk} \lambda_{wmk} / \sum_{w=1}^{W} \sum_{m=1}^{L} \sum_{k=1}^{R_m} \lambda_{wmk}$ and $F_{FLR} = \sum_{w=1}^{W} (1-I_w)$.

The following inputs are relevant to this determination: $\lambda_{111}:=10, \lambda_{211}:=5, \lambda_{112}:=5, \lambda_{212}:=5, \lambda_{121}:=1, \lambda_{221}:=10, \lambda_{122}:=0, \lambda_{222}:=10$. If virtual machine 1 in redundancy group 1 is patched in window 1 (potential solution vector (c)) as opposed to virtual machine 2 in redundancy group 1 being patched in window 1 (potential solution vector (e)), then more requests are lost from the users potential solution vector (e) than for potential solution vector (c). Thus, the objective function is smaller for solution (e) than for solution (c). Thus, solution (c) maximizes the objective function for this example.

Various variations of the preceding example are within the scope of the present invention.

In a variation of the preceding example, the three potential solution vectors eliminated by the constraints could be replaced by three additional randomly selected vectors, followed by a determination of whether application of the constraints eliminates any of the three additional randomly selected vectors. Any of the three additional randomly selected vectors eliminated by the constraints would be replaced in the same manner (i.e., by random selection). The preceding iterations would end when five remaining potential solution vectors satisfy all of the constraints. Then the potential solution vector, of the five remaining potential solution vectors, that results in the highest value of the objective function is deemed to be the actual solution vector.

In a variation of the preceding example, an iterative process could be employed. In each iteration, a potential solution vector is randomly chosen, tested against the constraints, and used to compute the value of the objective function if all of the constraints are satisfied. The iterations end upon elapse of a computation time constraint (i.e., if a total computer time for determining $x_{wmk}$ that maximizes the objective function exceeds a specified or predetermined maximum computer time threshold $t_{max-th}$). The actual solution vector is the potential solution vector that has maximum the objective function value as compared with the other potential solution vectors processed during the iterations.

In a variation of the preceding example, all potential solution vectors that are possible (i.e., 16 potential solution vectors in the preceding example) are processed instead of the 5 randomly selected potential solution vectors.

Features

Features of embodiments the present invention are described next.

In one embodiment, general high-availability requirement are mapped to approach specific configuration parameters of a patching service.

In one embodiment, an optimal placement of a VM of a workload to the time windows is determined.

In one embodiment, a business criticality of a patch is included in computing the patching schedule automatically.

In one embodiment, a workload intensity is included in computing the patching schedule automatically.

In one embodiment, a redundancy in the workload is used to compute the patching schedule automatically.

In one embodiment, a patching schedule that maximizes the residual availability of the system is automatically computed.

In one embodiment, the probability of failure of a VM to application of patches is automatically computed; the probability could be estimated from the history from similar VMs.

In one embodiment, a patching decision is associated to system automation software to help in failover (if required).

In one embodiment, input on which patching schedules are not allowed for the customer's workload and the minimum time between patching of any two VMs are included.

In one embodiment, a health check of the VMs other than the VM being patched in a redundancy group is performed and the patching is stalled if all the other VMs are down; if this VM is the only VM in a redundancy group, then the patching will continue.

In one embodiment, a variable number of patch windows is allowed.

In one embodiment, a workload definition could be TOSCA, HOT, etc.

In one embodiment, the patch schedule is dynamically recomputed as the existing workload properties change or a new workload introduced.

In one embodiment, the patching schedule is determined whenever a new patch advisory is received, since an arrival of a new patch advisory may affect the optimality of the patching schedule. The computation of the patching schedule may be synchronized with the timetable of application of patches by the Patch Execution Workflow component. Whenever a new patch is added to the list of patches P, or an approval for patching a server is obtained, or the number of currently available patch windows (W) changes, or the software applications within X change, or a new software application instance is introduced, or a change in freeze times, then the following procedure is executed for X software applications.

In one embodiment, if a new patch is added to P, then: $R_p(w)$ is updated and the matrix that holds the risk function associated with the new patch (and how the risk grows if the patch) is delayed to be applied.

In one embodiment, the present invention identifies for every software application x in X:

(i) For each new patch in P, patch applicability to x is computed; i.e., matrix A is updated based on the new advisory. The applicability of the new patch to x would be actually computed by the existing patch automation, such as IEM. For a patch that is an application level patch then the applicability is obtained from other sources (e.g., development environments) such as the consumer itself.

(ii) Matrix $M_{wlk}$ is updated based on user constraints on whether a VM should be patched or not in a patch window w.

(iii) Matrix $D_{mskj}$ is updated based on new dependencies introduced.

Placement of each VM in the available patch windows is determined by solving the optimization problem of minimizing the objective function. Once the patching schedule has been computed, the patching schedule is passed to the Patch Execution Workflow engine which may further decide when to schedule the patch updates based on the patching schedule. The Patch Execution Workflow updates the data structures once a VM has been patched.

Computer System

Figure 5:
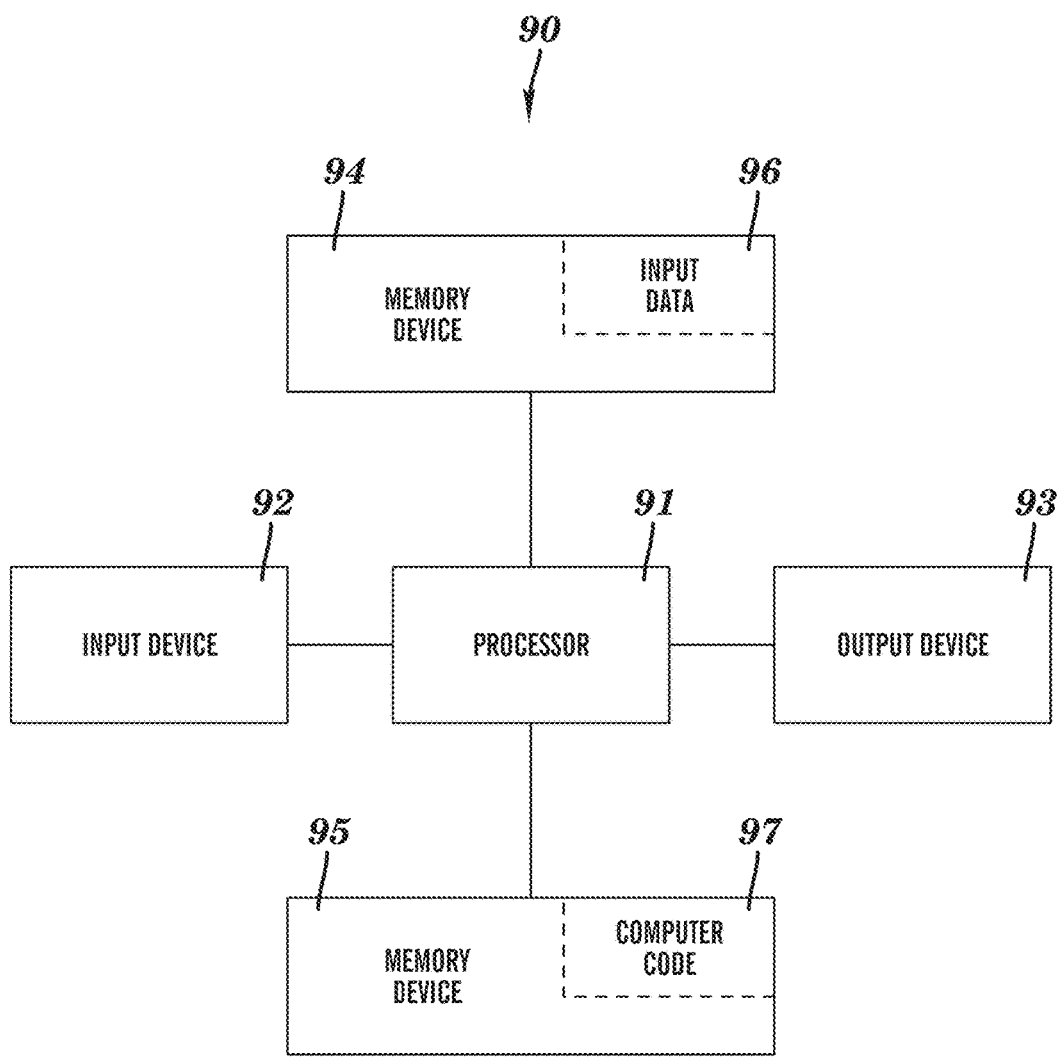
FIG. 5 illustrates a computer system used for patching virtual machines, in accordance with embodiments of the present invention.

FIG. 5 illustrates a computer system 90 used for patching virtual machines, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter aria, a keyboard, a mouse, etc. The output device 93 may be, inter aria, a printer, a plotter, a computer screen, a magnetic tape, a removable hard disk, a floppy disk, etc. The memory devices 94 and 95 may be, inter aria, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement an algorithm for patching virtual machines. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting, deploying and/or integrating computer infrastructure, integrating, hosting, maintaining, and deploying computer-readable code into the computer system 90, wherein the code in combination with the computer system 90 is capable of performing a method for patching virtual machines.

In another embodiment, the invention provides a method that performs the process steps of the invention on a subscription, advertising, and/or fee basis. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the a ay be utilized for the purposes stated supra in conjunction with the particular computer system 90 of FIG. 5. For example, the memory devices 94 and 95 may be portions of a single memory device rather than separate memory devices.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, said method comprising:
generating, by a processor of a computer system, a patching schedule applicable for patching virtual machines in L redundancy groups,
wherein said generating the patching schedule comprises scheduling, in W sequential time windows, P patches applicable to one or more virtual machines in the L redundancy groups, each redundancy group m (m=1, ..., L) comprising $R_m$ virtual machines, each redundancy group m (m=1, ..., L) independently belonging to a respective software application x of X software applications, wherein P≥1, L≥1, $R_m$≥1, and X≥1, wherein the L redundancy groups collectively comprise at least 2 virtual machines,
wherein said scheduling comprises determining, by the processor, $x_{wmk}$ for T tuples (w, m, k) defined by (w=1, ..., W) and (m=1, ..., L) and (k=1, ..., $R_m$), by maximizing an objective function (F) subject to one or more constraints, wherein said determining $x_{wmk}$ comprises setting $x_{wmk}$=1 if virtual machine k in redundancy group m is to be patched in time window w or setting $x_{wmk}$=0 otherwise, and
wherein the method further comprises patching, by the processor, the virtual machines in the L redundancy groups according to the patching schedule.

2. The method of claim 1,
wherein the objective function F is a linear combination of N objective function components $F_n$ (n=1, ..., N) expressed as $F=\Sigma_{n=1}^{N}\alpha_n F_n$ subject to N≥1,
wherein $\alpha_n$ (n=1, ..., N) are specified weights satisfying $\alpha_1>0$ and $\alpha_n\geq 0$ if n>1,
wherein $F_1=\Sigma_{x=1}^{X}B_x \min_w(\Pi_{m=1}^{L}A(x, m, n_{wm})-\Pi_{m=1}^{L}A(x, m, 0))$, wherein $B_x$ denotes a business criticality of software application x,
wherein $n_{wm}$ is a total number of virtual machines in redundancy group m assigned to time window w,
wherein $n_{wm}=\Sigma_{k=1}^{R_m}X_{wmk}$, and
wherein $A(x, m, n_{wm})$ denotes a residual availability of redundancy group m belonging to software application x when the $n_{wm}$ virtual machines in redundancy group m are not available in time window w.

3. The method of claim 2,
wherein $A(x, m, n_{wm})=(1-S_{xm}\Sigma_{i=AR_m}^{R_m-n_{wm}}\binom{R_m}{i}f^i (1-f)^{R_m-i})$,
wherein $S_{xm}$=1 or 0 if redundancy group m belongs, or does not belong, to software application x, respectively,
wherein $AR_m$ is a minimum number of virtual machines to be executed in redundancy group m for redundancy group m to be available, and
wherein f is a probability of failure of a virtual machine.

4. The method of claim 2,
wherein N≥2,
wherein $F_2=\Sigma_{w=1}^{W}(1-I_w)$,
wherein $I_w=\Sigma_{m=1}^{L}\Sigma_{k=1}^{R_m}x_{wmk}\lambda_{wmk}/\Sigma_{w=1}^{W}\Sigma_{m=1}^{L}\Sigma_{k=1}^{R_m}\lambda_{wmk}$, and
wherein $\lambda_{wmk}$ is a predicted rate of arrival of patching requests in time window w directed to virtual machine k in redundancy group m.

5. The method of claim 2,
wherein N≥2,
wherein $$F_2 = 1 - \frac{\sum_x B_x \sum_{p,w,m,k} S_{xm} A_{pmk} x_{wmk} R_p(w)}{\sum_x B_x \sum_{p,m,k} S_{xm} A_{pmk} x_{Wmk} R_p(W)},$$

wherein $S_{xm}$=1 or 0 if redundancy group m belongs, or does not belong, to software application x, respectively,
wherein $R_p(w)$ is risk, between 0 and 1 inclusive, of applying patch p in the time window w, and
wherein $A_{pmk}$=1 or 0 if the patch p is, or is not, applicable to virtual machine k in redundancy group m, respectively.

6. The method of claim 1, said method further comprising:
storing, by the processor, the determined $x_{wmk}$ for said T tuples, in a data store of the computer system.

7. The method of claim 1, wherein the one or more constraints comprise a freeze time constraint of setting $x_{wmk}$=0 for t tuples of the T tuples, subject to t<T.

8. The method of claim 1, wherein the one or more constraints comprise setting an upper limit of $C_w$ on a number of virtual machines that can be patched in time window w (w=1, ..., W).

9. The method of claim 1, wherein the one or more constraints comprise a minimum objective function constraint of requiring the objective function F to be equal to or greater than a specified or predetermined minimum F threshold ($F_{th}$).

10. The method of claim 1, wherein the one or more constraints comprise a computing time constraint of a total computer time, for determining $x_{wmk}$ that maximizes the objective function, that exceeds a specified or predetermined maximum computer time threshold $t_{max-th}$.

11. A computer program product, comprising a computer readable storage device having computer readable program code stored therein, said program code containing instructions executable by a processor of a computer system to implement a method, said method comprising:

generating, by the processor, a patching schedule applicable for patching virtual machines in L redundancy groups, wherein said generating the patching schedule comprises scheduling, in W sequential time windows, P patches applicable to one or more virtual machines in the L redundancy groups, each redundancy group m (m=1, ..., L) comprising $R_m$ virtual machines, each redundancy group m (m=1, ..., L) independently belonging to a respective software application x of X software applications, wherein P≥1, L≥1, $R_m$≥1, and X≥1, wherein the L redundancy groups collectively comprise at least 2 virtual machines, wherein said scheduling comprises determining, by the processor, $x_{wmk}$ for T tuples (w, m, k) defined by (w=1, ..., W) and (m=1, ..., L) and (k=1, ..., $R_m$), by maximizing an objective function (F) subject to one or more constraints, wherein said determining $x_{wmk}$ comprises setting $x_{wmk}$=1 if virtual machine k in redundancy group m is to be patched in time window w or setting $x_{wmk}$=0 otherwise, and wherein the method further comprises patching, by the processor, the virtual machines in the L redundancy groups according to the patching schedule.

12. The computer program product of claim 11, wherein the objective function F is a linear combination of N objective function components $F_n$ (n=1, ..., N) expressed as $F=\Sigma_{n=1}^{N}\alpha_n F_n$ subject to N≥1, wherein $\alpha_n$ (n=1, ..., N) are specified weights satisfying $\alpha_1 > 0$ and $\alpha_n \geq 0$ if n>1, wherein $F_1 = \Sigma_{x=1}^{X} B_x \min_w(\Pi_{m=1}^{L} A(x, m, n_{wm}) - \Pi_{m=1}^{L} A(x, m, 0))$, wherein $B_x$ denotes a business criticality of software application x, wherein $n_{wm}$ is a total number of virtual machines in redundancy group m assigned to time window w, wherein $n_{wm} = \Sigma_{k=1}^{R_m} x_{wmk}$, and wherein $A(x, m, n_{wm})$ denotes a residual availability of redundancy group m belonging to software application x when the $n_{wm}$ virtual machines in redundancy group m are not available in time window w.

13. The computer program product of claim 12, wherein $A(x, m, n_{wm}) = (1 - S_{xm}\Sigma_{i=AR_m}^{R_m - n_{wm}}\binom{R_m}{i} f^i (1-f)^{R_m - i})$, wherein $S_{xm}$=1 or 0 if redundancy group m belongs, or does not belong, to software application x, respectively, wherein $AR_m$ is a minimum number of virtual machines to be executed in redundancy group m for redundancy group m to be available, and wherein f is a probability of failure of a virtual machine.

14. The computer program product of claim 12, wherein N≥2, wherein $F_2 = \Sigma_{w=1}^{W}(1 - I_w)$, wherein $I_w = \Sigma_{m=1}^{L}\Sigma_{k=1}^{R_m} x_{wmk}\lambda_{wmk} / \Sigma_{w=1}^{W}\Sigma_{m=1}^{L}\Sigma_{k=1}^{R_m}\lambda_{wmk}$, and wherein $\lambda_{wmk}$ is a predicted rate of arrival of patching requests in time window w directed to virtual machine k in redundancy group m.

15. The computer program product of claim 12, wherein N≥2, wherein $$F_2 = 1 - \frac{\Sigma_x B_x \Sigma_{p,w,m,k} S_{xm} A_{pmk} x_{wmk} R_p(w)}{\Sigma_x B_x \Sigma_{p,m,k} S_{xm} A_{pmk} x_{Wmk} R_p(W)},$$

wherein $S_{xm}$=1 or 0 if redundancy group m belongs, or does not belong, to software application x, respectively, wherein $R_p(w)$ is risk, between 0 and 1 inclusive, of applying patch p in the time window w, and wherein $A_{pmk}$=1 or 0 if the patch p is, or is not, applicable to virtual machine k in redundancy group m, respectively.

16. A computer system, comprising a processor, a memory coupled to the processor, and a computer readable storage device coupled to the processor, said storage device containing program code executable by the processor via the memory to implement a method, said method comprising:

generating, by the processor, a patching schedule applicable for patching virtual machines in L redundancy groups, wherein said generating the patching schedule comprises scheduling, in W sequential time windows, P patches applicable to one or more virtual machines in the L redundancy groups, each redundancy group m (m=1, ..., L) comprising $R_m$ virtual machines, each redundancy group m (m=1, ..., L) independently belonging to a respective software application x of X software applications, wherein P≥1, L≥1, $R_m$≥1, and X≥1, wherein the L redundancy groups collectively comprise at least 2 virtual machines, wherein said scheduling comprises determining, by the processor, $x_{wmk}$ for T tuples (w, m, k) defined by (w=1, ..., W) and (m=1, ..., L) and (k=1, ..., $R_m$), by maximizing an objective function (F) subject to one or more constraints, wherein said determining $x_{wmk}$ comprises setting $x_{wmk}$=1 if virtual machine k in redundancy group m is to be patched in time window w or setting $x_{wmk}$=0 otherwise, and wherein the method further comprises patching, by the processor, the virtual machines in the L redundancy groups according to the patching schedule.

17. The computer system of claim 16, wherein the objective function F is a linear combination of N objective function components $F_n$ (n=1, ..., N) expressed as $F=\Sigma_{n=1}^{N}\alpha_n F_n$ subject to N≥1, wherein $\alpha_n$ (n=1, ..., N) are specified weights satisfying $\alpha_1 > 0$ and $\alpha_n \geq 0$ if n>1, wherein $F_1 = \Sigma_{x=1}^{X} B_x \min_w(\Pi_{m=1}^{L} A(x, m, n_{wm}) - \Pi_{m=1}^{L} A(x, m, 0))$, wherein $B_x$ denotes a business criticality of software application x, wherein $n_{wm}$ is a total number of virtual machines in redundancy group m assigned to time window w, wherein $n_{wm} = \Sigma_{k=1}^{R_m} x_{wmk}$, and wherein $A(x, m, n_{wm})$ denotes a residual availability of redundancy group m belonging to software application x when the $n_{wm}$ virtual machines in redundancy group m are not available in time window w.

18. The computer system of claim 17, wherein $A(x, m, n_{wm}) = (1 - S_{xm}\Sigma_{i=AR_m}^{R_m - n_{wm}}\binom{R_m}{i} f^i (1-f)^{R_m - i})$, wherein $S_{xm}$=1 or 0 if redundancy group m belongs, or does not belong, to software application x, respectively, wherein $AR_m$ is a minimum number of virtual machines to be executed in redundancy group m for redundancy group m to be available, and wherein f is a probability of failure of a virtual machine.

19. The computer system of claim 17, wherein N≥2, wherein $F_2 = \Sigma_{w=1}^{W}(1 - I_w)$, wherein $I_w = \Sigma_{m=1}^{L}\Sigma_{k=1}^{R_m} x_{wmk}\lambda_{wmk} / \Sigma_{w=1}^{W}\Sigma_{m=1}^{L}\Sigma_{k=1}^{R_m}\lambda_{wmk}$, and wherein $\lambda_{wmk}$ is a predicted rate of arrival of patching requests in time window w directed to virtual machine k in redundancy group m.

\* \* \* \* \*